March 20, 1956   L. R. HARMON   2,739,305
COMBINATION FLASH AND BEACON LIGHT
Filed Feb. 18, 1952   2 Sheets-Sheet 1

INVENTOR:
LUTHER R. HARMON
By Edward W. Weinert
His Attorney

March 20, 1956  L. R. HARMON  2,739,305
COMBINATION FLASH AND BEACON LIGHT
Filed Feb. 18, 1952  2 Sheets-Sheet 2
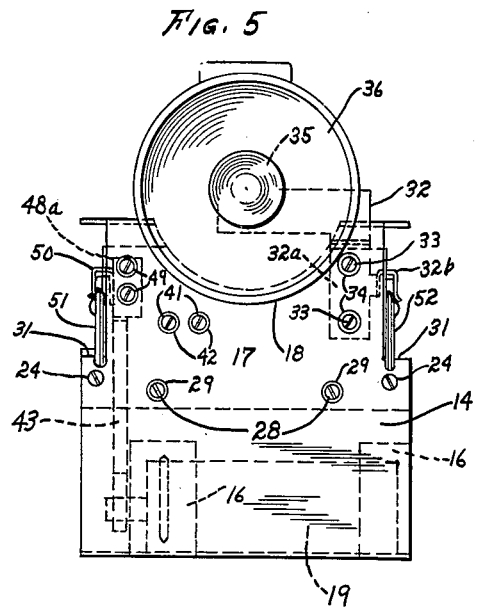
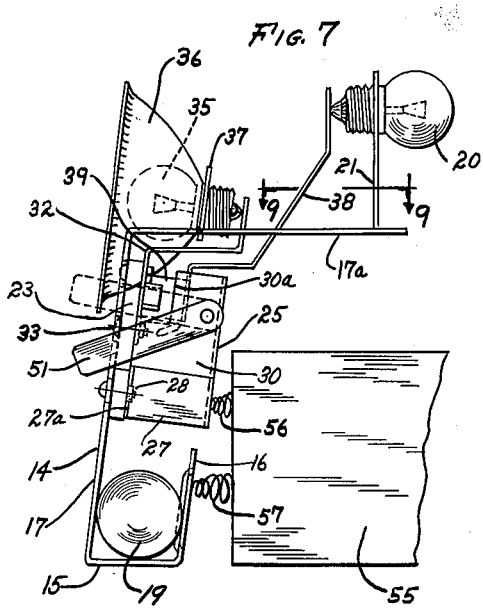
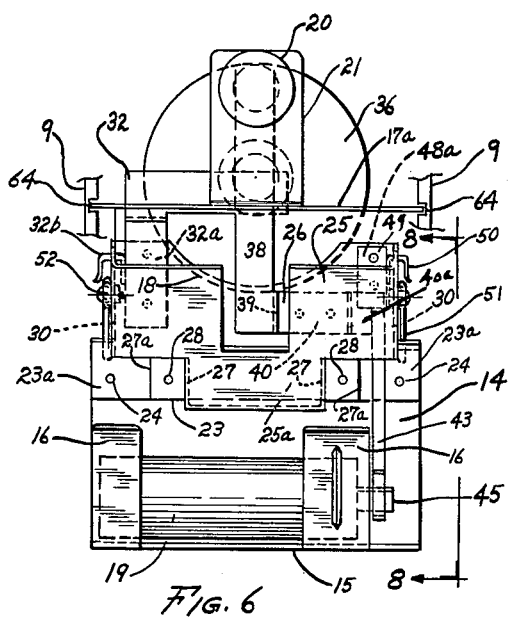
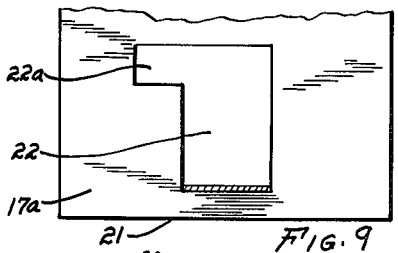
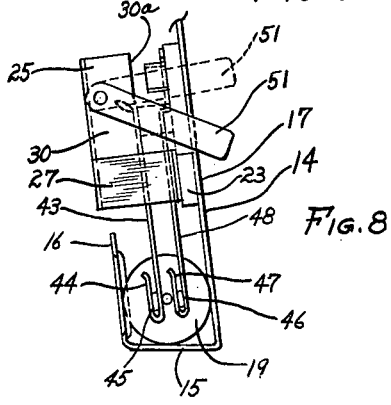
INVENTOR:
LUTHER R. HARMON
By Edward W. Weikert
HIS ATTORNEY

United States Patent Office 2,739,305
Patented Mar. 20, 1956

2,739,305

COMBINATION FLASH AND BEACON LIGHT

Luther R. Harmon, Chicago, Ill., assignor to
Hugh E. Hayes, Oregon, Wis., as trustee Application February 18, 1952, Serial No. 272,028

4 Claims. (Cl. 340—321)

This invention relates to a combination flash and beacon light and concerns itself with a transparent casing having a flash light lens in one end for transmitting a steady stream of light from a flash light bulb within the casing and having a flashing bulb within the casing for intermittently illuminating the transparent casing which serves as a beacon and means for energizing and controlling said bulbs.

Such a device is very useful for many purposes, but is primarily adapted for use in connection with automobiles and trucks and the like. In the event that a tire has to be changed or repairs made while on the road, the device can be supported on the road adjacent the car or truck and the switches turned on to illuminate both bulbs, one for sending a steady stream of light through the lens for supplying the necessary light for the job to be done and one for intermittently illuminating the casing to serve as a beacon or signal for any approaching vehicle.

One feature of the invention resides in incorporating the light producing and controlling means within a small transparent casing which can be carried in the glove compartment of a car or in a suit case or the like and in which the casing is designed to bring the intermittent flashing of the casing into better view with respect to an approaching vehicle.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 5 is an enlarged front elevational view of the mechanism within the casing;

Fig. 6 is a rear elevational view of the mechanism within the casing;

Fig. 7 is a side elevational view of the mechanism within the casing;

Fig. 8 is an end elevational view of the mechanism taken from the line 8—8 of Fig. 6; and Fig. 9 is a top plan view taken upon the line 9—9 of Fig. 7 looking in the direction of the arrows.

Figure 1:
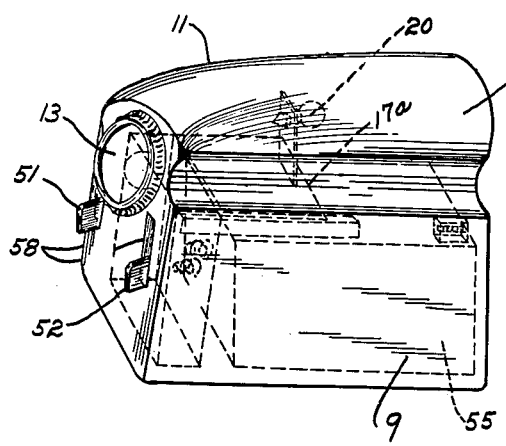
Fig. 1 is a perspective view of a combination flash and beacon light involving this invention.
Figure 2:
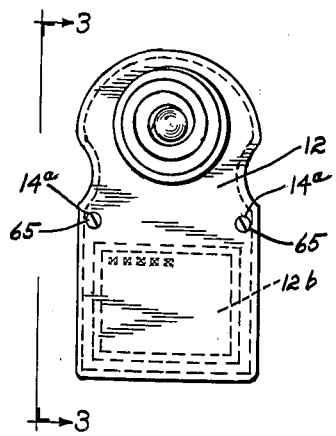
Fig. 2 is a rear end elevational view of the casing showing a bull's eye.

In referring now to Figs. 1 and 2 of the drawing, there is shown a transparent casing 9 preferably made of transparent plastic, the lower portion of which is substantially rectangular, but oblong and of a width so that it can be placed in the glove compartment of most cars. The rectangular portion provides a flat supporting base for the device and a housing for the operated parts. The upper portion of the casing is transversely curved as indicated at 10 and this curved portion 10 slopes downwardly from the rear to the front as indicated at 11. As a result when the rear portion of the casing is illuminated, it will appear above the front end of the casing and be more readily observable from a vehicle approaching toward the front end of the device. The entire casing is molded from the same transparent plastic, but it will be evident that the lower or base portion need not be transparent.

The casing is moulded in the form of a housing with a removable closure 12 at the rear end for the insertion of the operating and supporting mechanism therefor. The flash light lens 13 is secured in the front end in any known suitable manner while the rear closure may have an integral bull's eye 12a. The closure may be secured by bolts 14a extending through the casing and through the rear wall thereof or in any suitable manner. A reflector 12b is preferably secured to the inside of the closure 12 to reflect oncoming lights if the beacon light fails.

Within the casing there is a light frame which supports the various parts such as the light bulbs and the switches. This frame which is designated as a whole by the reference numeral 14, consists of a base portion 15 having two upstanding spaced portions 16 and a vertical plate like portion 17 having a concave recess 18 at its upper portion. This vertical portion 17 is in spaced relation to the upstanding portions 16 so as to provide a space or seat therebetween for a thermo switch 19 which may be of any suitable construction.

At the concave recess 18, the plate 17 extends at substantially a right angle as indicated at 17a to provide a support for a light bulb 20 which is mounted in a bracket 21 struck from the horizontal portion 17a. The slot 22 formed by the struck up bracket 21 has a lateral offset 22a for a purpose that will later appear.

Upon the upper portion of the vertical plate 17, there is an insulation which is in the form of a triangular plate 23 having laterally extending ears 23a at its lower end for attachment to the plate 17 by bolts 24. A current conducting bracket 25 which extends transversely is attached to the plate 17. This bracket 25 has an upper central cut out portion forming a recess 26 (Fig. 6) for a purpose that will later appear. The lower portion of the bracket 25 is reduced in width as indicated at 25a in Fig. 6 and this reduced portion has a leg 27 at each end and each leg 27 has a foot 27a attached to the insulated plate 23 by bolts 28, the heads of which extend into larger holes 29 in the plate 17 to keep insulated therefrom. The upper portion of the bracket 25 has side wings 30 which extend to the insulated plate 23 and each side wing 30 has an upper cut out portion 30a at its inner end as shown in Fig. 8 for a purpose that will later appear. It will be noted that the upper portion of plate 17 is cut away above the ears 23a on the insulation plate 23 as indicated at 31 and is flush with the side wings 30 of the bracket 25 for a purpose that will later appear.

An angular switch member 32 is attached to the insulated plate 23 by means of bolts 33, the heads of which extend into larger holes 34 in the plate 17 to remain insulated therefrom. This switch member 32 forms a contact with a flash light 35 which is suitably supported in a shade 36 resting in the concave recess 18 of plate 17, by means of a concave bracket 37 rising from top horizontal portion 17a of plate 17. The attached foot 32a of switch member 32 is provided with a laterally offset hook 32b.

A second angular switch member 38 forms a contact with the light bulb 20. This switch member has a leg 39 at one edge which has a foot 40 attached to the insulated plate by means of bolts 41, the heads of which extend into larger holes 42 (Fig. 5) in plate 17 to avoid contact therewith. The foot 40 has an outwardly directed flange 40a (Fig. 6) at its end which merges with a downwardly extending conductor 43 (Fig. 8) having a hook 44 at its lower end engaging a terminal post 45 of the thermo switch 19. Thus the switch member 38 and the conductor 43 constitute an integral member fastened to the insulation by the foot 40 and screws 41. The other terminal 46 of the thermo switch is connected with a hook 47 on a conductor 48 which extends upwardly to a point near the top of the insulated board 23 where it is provided with an attaching portion 48a secured to the insulated board 23 by means of bolts 49, the heads of which extend into larger holes in the plate 17 just as the other securing bolts. The attaching portion 48a has a laterally offset hook 50, adapted for engagement by a switch lever as will later appear.

A switch lever 51 is pivoted to a side wing of one of the wings of the bracket 25 and is adapted for engaging the hook 50, while a switch lever 52 is pivoted to the other wing of the bracket 25 and is adapted for engaging the hook 32b. The switch levers and bracket 25 constitute conductors of electricity and the closing of one switch will cause the illumination of one light, while the closing of the other switch lever will illuminate the other light. The closure of both switches will illuminate both lights.

A battery 55 is adapted to be supported upon the bottom of the casing and the terminal end of this battery is provided with yieldable contact terminals 56 and 57 which may be in the form of coil springs. One end of spring 56 is attached to a battery post while the other end engages the insulated bracket 25. The other contact spring 57 is attached to the other battery post and engages the adjacent upright 16 which goes to ground, since it is insulated from the bracket 25. Switch levers 51 and 52 in assembled form extend through suitable slots 58 in the front end of the casing. When switch lever 51 is moved to engage hook 50, a circuit is established from the battery through bracket 25 to switch arm 51 and hence to conductor 43 to thermo switch 19 and from thermo switch 19 through conductor 48 and switch member 38 to light bulb 20 which will be caused to flash on and off intermittently.

When switch lever 52 is closed, the current from the battery 55 will pass to bracket 25 and from bracket 25 to switch lever 52 which is now connected to hook 32b on the switch member 32 for illuminating the light 35 which it will be noted is not in the flashing circuit and will produce a steady light.

Figures 3, 4:
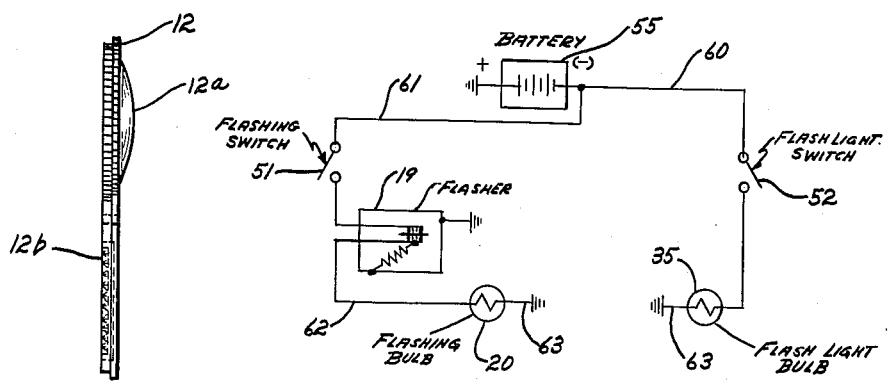
Fig. 3 is an edge view of the rear closure of the casing taken upon the line 3—3 of Fig. 2 looking in the direction of the arrows.
Fig. 4 is a wiring diagram of the circuits used in the device.

In Fig. 4, there is shown the wiring circuit in which the battery 55 is connected with light bulb 35 through conductor 60 and switch 52. The battery is also connected by conductor 61 and switch 51 with the thermo switch 19 which in turn is connected with the flashing bulb 20 by conductor 62. The bulbs 20 and 35 are connected to ground as indicated at 63 which in the structure constitutes plate 17 and one upright 16.

In assembling the device, the rear closure 12 is removed, the frame with the lights and switches is then inserted in the casing; the inside surface of the casing may be provided with any suitable means for guiding the top plate 17a and maintaining the same in stable position such as opposite grooves 64 in the wall of the casing as indicated in Fig. 6. After the frame has been inserted, the battery 55 is then inserted with the yielding contact terminals 56 and 57 pressing against the bracket 25 and the upright 16 respectively. The closure 12 may then be secured by bolts 65 (Fig. 2) for holding the battery and frame in proper positions.

In use, the flashing bulb 20 will illuminate the upper or curved part of the casing in intermittent flashes causing the whole upper part of the casing to glow and the rearward upward slope will bring the glow into clear focus to a driver approaching toward the front end of the device while the bull's eye will present a clear view to a driver approaching toward the rear end of the device. This flashing bulb will hence serve as a signal. The flash or steady bulb 35 is intended to furnish the necessary illumination for any task in connection with an automobile.

While I am aware that lantern-type devices for such a purpose are now in use, I do not know of any device that involves a transparent plastic casing which houses all of the parts and which can be carried in any kind of case or put in the glove compartment of a car and that furnishes the flashing illumination through a transparent casing as is herein disclosed.

I am aware that many changes may be made and various details of construction may be modified without departing from the principles of this invention, so I do not propose limiting the patent granted otherwise than necessitated by the appended claims.

I claim:

1. In a device of the class described, a plastic casing having a lower rectangular portion and an upper transversely curved transparent portion sloping from the rear to the front end, a light transmitting lens in the front end of the casing, a light bulb having a concave shade in said casing for transmitting light rays through said lens, a second light bulb in said casing rearward of said shade for illuminating the upper portion of said casing, a source of electrical energy in said casing, and electrical conducting means connecting said source of energy with said light bulbs including switch levers operable from a point outside of said casing, a part of said electrical conducting means serving to support said bulbs and switch levers.

2. In a device of the class described, a casing an upper transparent portion, a light transmitting lens in one end of said casing, an electric light bulb in said casing and having a concave shade for transmitting light rays through said lens, a second light bulb in said casing rearward of said shade for intermittently illuminating the top portion of said casing, a battery in said casing, a switch controlled circuit connecting said battery with the first light bulb, a switch controlled circuit connecting said battery with said second light bulb, a thermo responsive switch in said second circuit and means within said casing for supporting said light bulbs and circuits, and a part of each circuit.

3. In a device of the class described, a casing having an upper transparent portion, a lens in the front end of said casing, a light bulb in said casing and having a concave shade for transmitting light rays through said lens, a second light bulb in said casing rearward of said shade for illuminating the upper portion of said casing, a frame in said casing for supporting said light bulbs, a conductor bracket extending across said frame in insulated relation with said frame, a battery in said casing having a yieldable terminal in contacting relation with said bracket, and a yieldable terminal in contacting relation with said frame, electrical conducting means including a switch lever connecting said bracket with the first mentioned light bulb, electrical conducting means connecting means including a switch lever connecting said bracket with said second light bulb and a thermo switch in said second mentioned electrical conducting means.

4. In a device of the class described, a casing having an upper transparent portion, a lens in the front end of said casing, a light bulb in said casing and having a concave shade for transmitting light rays through said lens, a second light bulb within said casing rearward of said shade for intermittently illuminating the top portion of said casing, a frame within said casing having means for supporting said light bulbs and a seat adapted for supporting a thermo responsive switch, an electrical conducting bracket carried by said frame in insulated relation therefrom, a battery having yieldable terminal posts, one in engagement with said bracket and the other in engagement with said frame, conducting means connecting said bracket with said light bulbs including switch levers mounted upon said bracket and operable from without said casing, a thermo switch mounted upon said seat and having an electrical connection with one of said levers.

References Cited in the file of this patent

UNITED STATES PATENTS

| | | |
|---|---|---|
| 2,172,925 | Meyerhoefer | Sept. 12, 1939 |
| 2,174,067 | Bahr | Sept. 26, 1939 |
| 2,221,178 | Best | Nov. 12, 1940 |
| 2,224,742 | Muldoon | Dec. 10, 1940 |
| 2,408,568 | McLure | Oct. 1, 1948 |
| 2,491,094 | DuFrane | Dec. 13, 1949 |
| 2,496,618 | Cox et al. | Feb. 7, 1950 |
| 2,589,747 | Tedeschi | Mar. 18, 1952 |
| 2,593,784 | Nyberg | Apr. 22, 1952 |
| 2,597,705 | Clines | May 20, 1952 |